US007733480B2

(12) United States Patent
Le Texier et al.

(10) Patent No.: US 7,733,480 B2
(45) Date of Patent: Jun. 8, 2010

(54) DEVICE TO AID THE POSITIONING OF A PILOT IN AN AIRCRAFT

(75) Inventors: Maxime Le Texier, Toulouse (FR); Georges Duchams, Fonsorbes (FR)

(73) Assignee: Airbus France (FR)

( * ) Notice: Subject to any disclaimer, the term of this patent is extended or adjusted under 35 U.S.C. 154(b) by 362 days.

(21) Appl. No.: 11/766,199

(22) Filed: Jun. 21, 2007

(65) Prior Publication Data
US 2009/0015828 A1    Jan. 15, 2009

(30) Foreign Application Priority Data
Jun. 22, 2006    (FR) .................................. 06 52585

(51) Int. Cl.
*G02B 27/32* (2006.01)
*G01C 23/00* (2006.01)
(52) U.S. Cl. .................. 356/247; 356/251; 356/252; 356/141.2; 356/148; 340/973; 340/980
(58) Field of Classification Search ................. 356/247, 356/251–252, 141.2, 614–615; 364/559; 324/207.13; 340/960, 973, 958, 980, 968
See application file for complete search history.

(56) References Cited

U.S. PATENT DOCUMENTS

| | | | | |
|---|---|---|---|---|
| 3,574,283 A | * | 4/1971 | Albers | 73/178 R |
| 4,047,014 A | * | 9/1977 | Morrison et al. | 708/810 |
| 4,326,189 A | * | 4/1982 | Crane | 340/973 |
| 5,166,746 A | * | 11/1992 | Sato et al. | 356/141.2 |
| 5,264,913 A | * | 11/1993 | Hegg et al. | 356/251 |
| 5,296,854 A | * | 3/1994 | Hamilton et al. | 340/980 |
| 5,457,641 A | * | 10/1995 | Zimmer et al. | 702/153 |
| 6,473,676 B2 | * | 10/2002 | Katz et al. | 701/4 |
| 6,814,578 B2 | * | 11/2004 | Vorst | 434/38 |

FOREIGN PATENT DOCUMENTS

DE    3505173 C1    10/1986

\* cited by examiner

*Primary Examiner*—Sang Nguyen
(74) *Attorney, Agent, or Firm*—Perman & Green LLP

(57) ABSTRACT

A visual aid is used by a pilot in an aircraft to position himself in the cockpit by an axial movement, called movement along the X axis, in an aircraft reference coordinate system, and by a vertical movement, called movement along the Z axis, in the aircraft reference system. The visual aid comprises two geometric shapes (3, 4), separated in space and designed to be visually aligned by the pilot; these shapes have the characteristic that each has a visual reference (31, 41) on its surface, approximately in the same horizontal plane perpendicular to the vertical XZ plane.

11 Claims, 3 Drawing Sheets

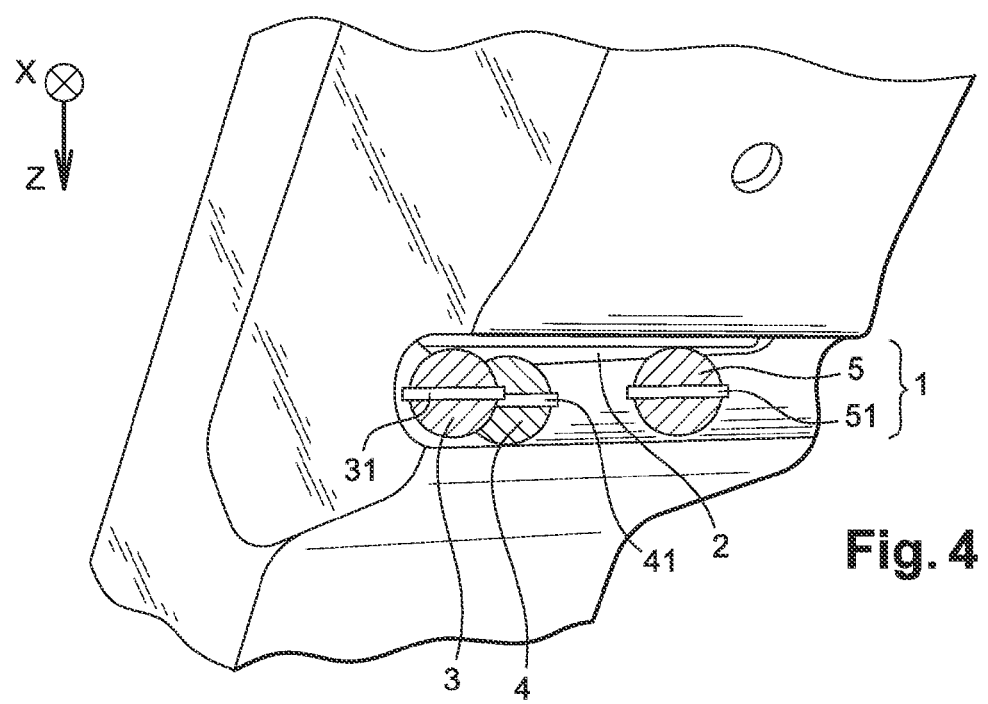

DEVICE TO AID THE POSITIONING OF A PILOT IN AN AIRCRAFT

BACKGROUND OF THE INVENTION

The present invention relates to a device to aid the positioning of a pilot in an aircraft, so that he may accurately view the outside environment and the on-board instruments. More particularly, the invention concerns a device that permits improving the precision of positioning the pilot in the cockpit, particularly his height position.

On board an aircraft, pilots must be precisely positioned in order to assure good visibility of the various instruments and to guarantee that the pilot has a view of the outer environment that conforms to regulatory requirements. Among other things, the quality of this positioning permits improving the pilot's performance, both at the level of time saved in adjusting the seat each time, as well as improving the level of comfort, thus decreasing eye and muscle fatigue due to slight but repetitive movements of the head. In order to regulate his position in the cockpit, the pilot generally uses a visual aid that permits him to create a theoretical point in space, called the theoretical pilot eye position, said theoretical point being situated roughly between both eyes. The visual aid consists of two spheres (3, 4) that are offset spatially by several millimeters of diameter, as illustrated in FIG. 1. The line passing through the centers of said spheres intersects a plane that is vertical to the aircraft reference coordinate system and this plane passes through the position of the pilot's axis relative to the position of the theoretical pilot eye position. Thus, when the pilot is positioned in the vertical plane corresponding to his longitudinal axis in the airplane (i.e., the plane of symmetry of his seat), he is correctly placed when the two spheres are aligned. In order to attain this theoretical eye position, the pilot moves his seat, most often by a front/back movement along an axis roughly parallel to the longitudinal axis of the aircraft reference system and by an up/down movement along an axis roughly parallel to the vertical axis of the aircraft reference system.

The disadvantage of a device for aiding the positioning of a pilot that has this visual aid is that said device is only precise when the spheres are very small in size, but the pilot views these spheres better when they are larger in size.

The implementation of a device for aiding pilot positioning that permits improving the precision of pilot positioning in an aircraft is therefore important, both in order to improve his comfort as well as to simplify the positioning operations.

The present invention proposes to improve how the pilot perceives the alignment of the visual aid without increasing the size of said visual aid and without loss of positioning precision.

SUMMARY OF THE INVENTION

A pilot in an aircraft is positioned by means of a visual aid, by an axial movement, called movement along the X axis, in an aircraft reference system, and by a vertical movement, called movement along the Z axis, in the aircraft reference system, said X and Z movements defining a vertical plane XZ. According to the invention, the device is a visual aid that has two geometric shapes that are spatially offset and designed to be visually aligned by the pilot adjusting his position. Said two geometric shapes each have a visual reference on their surface, roughly in the same horizontal plane, perpendicular to the XZ vertical plane. Thus, the visual references provide the horizontal plane on which the pilot must position his eyes much more precisely than when there are no visual reference on the geometric shapes.

In one embodiment, at least one visual reference is created by a concave shape.

In another embodiment, at least one visual reference is created by a convex shape.

In another embodiment, the visual reference is created by a mark of a color that contrasts with the surface color of the geometric shape.

In one embodiment, the geometric shapes and the visual references are made in one piece.

In another embodiment, the visual reference created by an annular convex shape on the surface of the geometric shape is added onto said geometric shape.

Preferably, the geometric shapes are roughly spherical or cylindrical relative to the vertical axis.

In a particular embodiment, the device has three geometric shapes to aid the simultaneous positioning of two pilots, one of the three geometric shapes being common to the two pilots, and the three geometric shapes each have a visual reference on their surface, approximately in the same horizontal plane perpendicular to the XZ vertical plane. To position himself correctly, each pilot must visually align the common geometric shape with one of the other two geometric shapes, the common geometric shape corresponding to the closest or furthest geometric shape for each pilot.

DESCRIPTION OF THE DRAWING

A detailed description of the device is made in reference to the figures, wherein:

FIG. 4 shows a schematic view of a device according to the invention, which can be used by two pilots simultaneously for adjusting different theoretical positions.

DETAILED DESCRIPTION OF THE INVENTION

Figure 1:
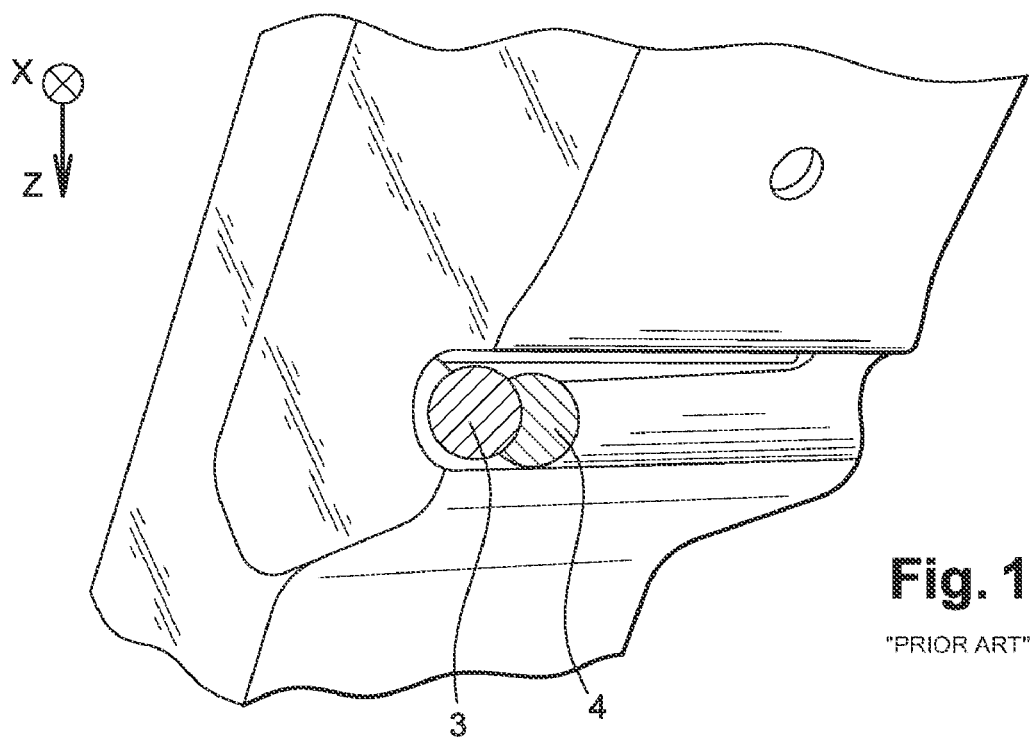
FIG. 1 shows a schematic view of a device for aiding the positioning of a pilot in an aircraft according to the prior art.
Figure 2:
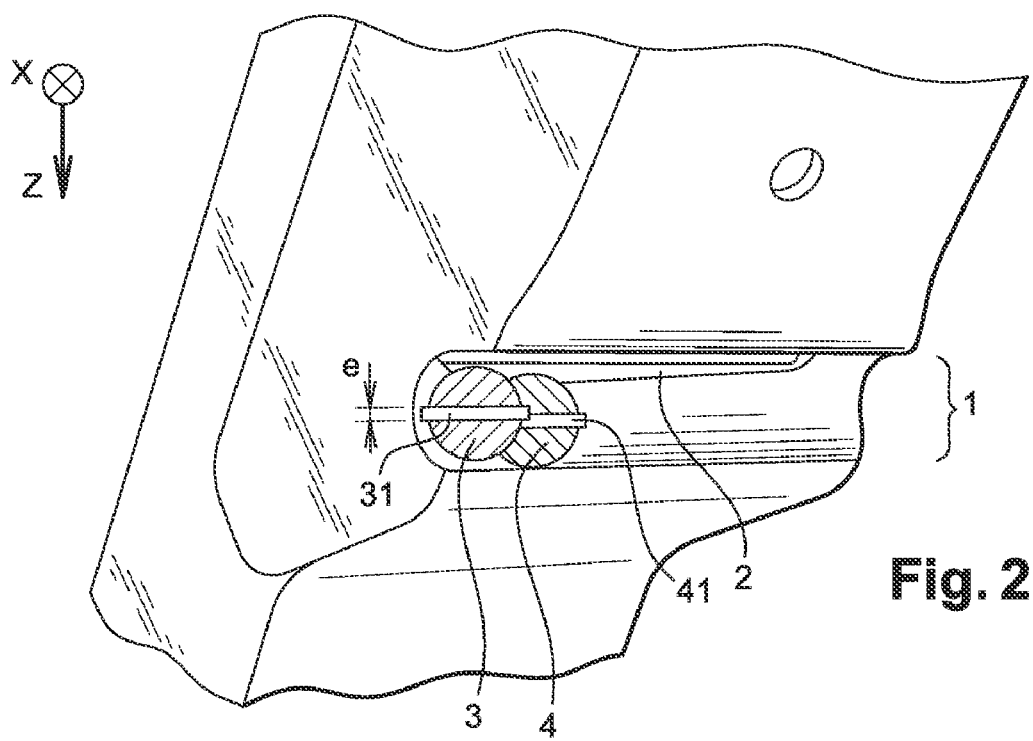
FIG. 2 shows a schematic view of a device according to the invention, placed on a vertical post of the aircraft windshield.

A device 1 for aiding the adjusting of the pilot's position in an aircraft by means of a visual aid according to the invention, as illustrated in FIG. 2, comprises:

a first geometric shape 3, having a visual reference 31, a second geometric shape 4, having a visual reference 41.

Advantageously, said first and second geometric shapes are spherical shapes. The embodiment example is described for such spherical shapes, but this choice does not limit the invention.

In order to achieve the desired visibility inside and outside the aircraft, the pilot positions himself by moving his seat. To permit a satisfactory adjustment according to the pilot's physical stature, the seat is adjusted roughly along the X and Z axes relative to the aircraft reference system, i.e., by a front/back movement (X axis) and an up/down movement (Z axis). The XZ plane, defined by X movements and Z movements of the seat, passes through the axis of the seat, and is thus situated in the axis in which the pilot sits in a piloting position.

The two spheres 3, 4 are separated and positioned in space outside of the XZ plane, so that their centers create a line that passes through the targeted position of the theoretical pilot eye position, said eye position being situated in the XZ plane. For this, sphere 3 is positioned between the pilot and sphere 4. Thus, when the pilot only sees sphere 3, he is positioned correctly in the X and Z axes. Preferably, the centers of both spheres are roughly in the same horizontal plane that is perpendicular to the XZ plane.

Spheres 3, 4 are roughly of the same angular dimension. Advantageously, since the distance between the spheres is relatively small when compared to the distance between the pilot and the device, the spheres 3, 4 are made with the same dimensions. In order to differentiate between them, and therefore to permit the pilot to observe whether only one sphere is visible, said spheres are made of contrasting colors.

Visual references 31, 41 have an annular shape and are situated at the surface of spheres 3, 4. Said visual references have a thickness e that is somewhat smaller than the diameters of the spheres, and are roughly in a plane perpendicular to the XZ plane, and they preferably have a position along the Z axis corresponding to the targeted Z position of the theoretical pilot eye position. Thus, the visual references create the horizontal plane in which the pilot must position his eyes.

In a preferred embodiment, visual references 31, 41 are made of a relief or raised shape, advantageously in a contrasting color to the color of the sphere.

Figure 3A:
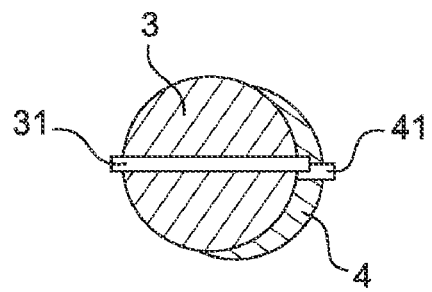
FIG. 3 shows schematic views (a, b, c, d, e, f) of geometric shapes of the device illustrating examples of arranging the visual references on the geometric shapes.

In one example of embodiment, the raised shape is a convex shape on the sphere, such as in the example of FIG. 3a. Said convex shape is made at the surface of the sphere, preferably in the horizontal plane where the sphere has the greatest diameter.

In one embodiment, the convex shape is an annular piece joined to the sphere, made of a material, for example, an elastomer O-ring. Said convex shape is attached to the sphere, for example by gluing, or positioned and held in a groove hollowed in the sphere.

In another embodiment, the sphere and the convex annular shape are made of a single piece, for example by machining or molding the sphere having the convex shape.

Figure 3B:
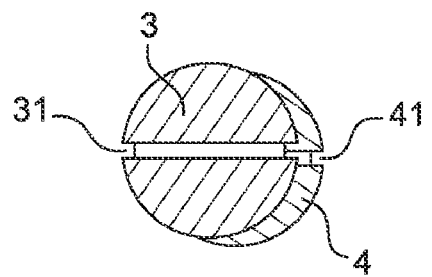

In another example of embodiment, the relief shape is a concave annular shape in spheres 3, 4, for example a groove, as is illustrated in FIG. 3b.

Figure 3C:
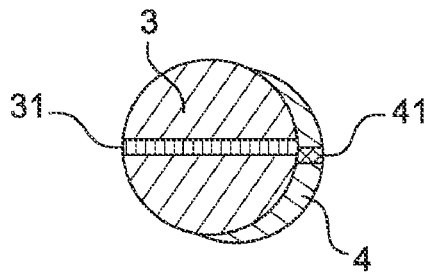

In another embodiment, visual references 31, 41 are made by a mark of contrasting color visible on the surface of spheres 3, 4, for example, a paint mark, such as in the example of FIG. 3c.

In one example of application, each sphere 3, 4 has the same visual reference 31, 41. For example, two annular convex shapes, as is illustrated in FIG. 3a,
two annular concave shapes, as is illustrated in FIG. 3b,
two marks of contrasting color visible on the surface of the two spheres, as is illustrated in FIG. 3c.

Figure 3D:
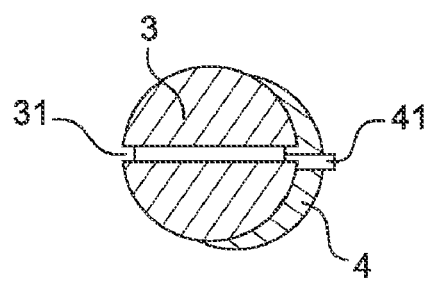
Figure 3E:
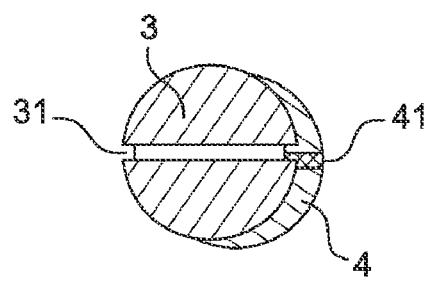
Figure 3F:
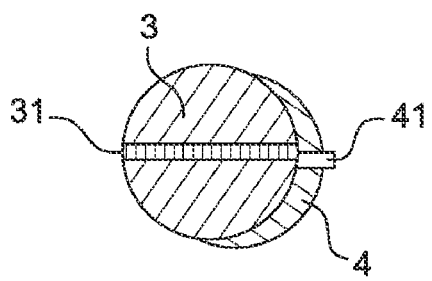

In another example of application, each of the two spheres 3, 4 has a different visual reference. In practice, the positions of the visual references on the spheres are complementary. For example:

sphere 3, positioned between the eye of the pilot and sphere 4, has an annular concave shape and sphere 4, further from the pilot, has an annular convex shape, such as illustrated in FIG. 3d. In this example, the pilot positions himself by visually superimposing the extension of the convex shape of sphere 4 to coincide with the concave shape of sphere 3.

sphere 3, the closest to the pilot, has an annular concave shape and sphere 4, the furthest from the pilot, has a mark of contrasting color visible on said sphere, as is illustrated in FIG. 3e.

sphere 3, the closest to the pilot, has a mark of contrasting color visible on said sphere and sphere 4, furthest from the pilot, has an annular convex shape, as is illustrated in FIG. 3f.

The present invention is not limited to spherical geometric shapes. Other geometric shapes, for example a cylindrical shape, with an approximately vertical axis, having a visual reference in the shape of a circular ring, can also be used. The person skilled in the art will be able to adapt the invention to geometric shapes not described here.

Preferably, in order not to disrupt the visibility of the pilot, spheres 3, 4 are attached onto a support 2, said support being attached to one of the vertical posts of the cockpit windshield, in order not to be situated in the line of sight defined by the transparent parts of the windshield and the side windows.

When two pilots are seated in the aircraft, each pilot has a device for aiding his own positioning.

In a particular embodiment, as illustrated in FIG. 4, a single device having three geometric shapes 3, 4, 5, is created for aiding the positioning of both pilots. The three geometric shapes 3, 4, 5 are arranged in space so that one shape, for example geometric shape 4, is common to both pilots, and so that the other two are specific only to one pilot. Preferably, the centers of the three geometric shapes are approximately in the same horizontal plane, perpendicular to the XZ plane. Each shape, advantageously spherical, has a visual reference 31, 41, 51, described in the examples above. Thus, in order to be correctly positioned, each pilot must visually align the common sphere 4 with one of the other two spheres 3, 5.

In the example of embodiment presented in FIG. 4, sphere 3 or sphere 5, respectively, is positioned between the first pilot or the second pilot, respectively, and common sphere 4.

In another example of embodiment, common sphere 4 is positioned between the pilot and sphere 3 or 5.

Preferably, in order to permit the same quality of adjustment for each pilot, said device is placed in a vertical plane equidistant from the two pilots, for example, on the central vertical post of the windshield.

The invention therefore permits obtaining a device that improves the visibility of geometric shapes for positioning and increases the precision in positioning, particularly height positioning in the Z axis.

The invention claimed is:

1. A device for aiding the positioning of a pilot in an aircraft comprising:
a support for the pilot constructed to allow adjustment of the position of the pilot along horizontal and vertical axes relative to an aircraft reference coordinate system;
a visual aid for identifying the optimum pilot eye position for good visibility further comprising:
a first geometric shape having a first visual reference associated therewith;
a second geometric shape having a second visual reference associated therewith complimentary with the first visual reference;
wherein the second geometric shape is placed between the pilot and the first geometric shape so that their centerlines are aligned with the optimum pilot eye position along an axis of view of the pilot; and
wherein the first and second visual references are positioned on their respective geometric shapes to assist the pilot in visually aligning the first and second geometric shapes along the axis of view of the pilot in both the vertical and horizontal planes by adjusting the position of the support.

2. The device according to claim 1 wherein at least one visual reference is created by a concave shape.

3. The device according to claim 1 wherein at least one visual reference is created by a convex shape.

4. The device according to claim 1 wherein at least one visual reference is created by a mark in a color contrasting to the surface color of geometric shape.

5. The device according to claim 1 wherein each of the geometric shapes and their associated visual references are made of a single piece.

6. The device according to claim 1 wherein the visual references are joined to their respective geometric shapes.

7. The device according to claim 1 wherein the geometric shapes are roughly spherical.

8. The device according to claim 1 wherein geometric shapes are roughly cylindrical relative to the vertical axis.

9. The device according to claim 1 wherein said device has three geometric shapes to aid in the simultaneous positioning of two pilots, one of the three geometric shapes being common to both pilots, each of the three geometric shapes having a visual reference on their surface, approximately in the same horizontal plane perpendicular to the vertical plane.

10. The device according to claim 9 wherein the common geometric shape, for each pilot, corresponds to the geometric shape closest to the position of said pilot.

11. The device according to claim 9 wherein the common geometric shape, for each pilot, corresponds to the geometric shape furthest from the position of said pilot.

* * * * *